United States Patent [19]

Kobayashi et al.

[11] Patent Number: 5,225,487
[45] Date of Patent: Jul. 6, 1993

[54] VINYL CHLORIDE RESIN COMPOSITION

[75] Inventors: Takayasu Kobayashi, Itami; Keisuke Yagi, Takatsuki, both of Japan

[73] Assignee: Sumitomo Bakelite Company Limited, Tokyo, Japan

[21] Appl. No.: 747,408

[22] Filed: Aug. 19, 1991

Related U.S. Application Data

[63] Continuation of Ser. No. 530,699, May 30, 1990, abandoned.

[30] Foreign Application Priority Data

Aug. 9, 1989 [JP] Japan ................. 1-204813

[51] Int. Cl.⁵ ............... C08F 8/30; C08L 75/04; C08L 75/08; C08L 27/06
[52] U.S. Cl. .................. 525/123; 525/125; 525/131; 525/460; 525/455; 525/239
[58] Field of Search ............ 525/125, 131, 453, 455, 525/460, 123, 239

[56] References Cited

U.S. PATENT DOCUMENTS

| | | | |
|---|---|---|---|
| 4,337,320 | 6/1982 | Moringa | 521/95 |
| 4,672,095 | 6/1987 | Ito et al. | 525/455 |
| 4,873,285 | 10/1989 | Ryntz | 525/131 |

FOREIGN PATENT DOCUMENTS

| | | | |
|---|---|---|---|
| 0323197 | 7/1989 | European Pat. Off. | |
| 2284638 | 4/1976 | France | |
| 8198555 | 11/1983 | Japan | 525/125 |
| 9038215 | 3/1984 | Japan | 525/455 |
| 9129214 | 7/1984 | Japan | 525/455 |
| 9161418 | 9/1984 | Japan | 525/455 |
| 62-48751 | 3/1987 | Japan | |
| 104860 | 5/1987 | Japan | |
| 265339 | 11/1987 | Japan | |
| 2107326 | 4/1983 | United Kingdom | 525/455 |

*Primary Examiner*—James J. Seidleck
*Assistant Examiner*—W. R. H. Clark
*Attorney, Agent, or Firm*—Browdy and Neimark

[57] ABSTRACT

A vinyl chloride resin composition which comprises 100 parts by weight of a reaction product of a polyol-containing vinyl chloride polymer with an isocyanate compound, the urethane content in the reaction product being 30-60% by weight, 10-300 parts by weight of a vinyl chloride resin comprising 8-90% by weight of a tetrahydrofuran-insoluble polyvinyl chloride gel portion and the remainder of a tetrahydrofuran-soluble portion and 0-200 parts by weight of a plasticizer.

13 Claims, No Drawings

VINYL CHLORIDE RESIN COMPOSITION

This application is a continuation of application Ser. No. 07/530,699 filed May 30, 1990, now abandoned.

The present invention relates to a vinyl chloride resin composition which can provide molded products, having a lower degree of surface tackiness.

In general, for a flexible vinyl chloride resin of less than 80 in hardness according to JIS K6301 A type, a plasticizer is used in a large amount and the plasticizer exudes to the surface of molded products, resulting in high tackiness when the surface is touched. The tackiness of a flexible vinyl chloride resin is extremely serious particularly for automobile parts such as steering wheel, knob and assist grip which are touched by hands very often.

As materials for interior trims of automobiles which are lower in tackiness, a urethane resin has been used, but this resin suffers from the problems that cost is high; color matching is difficult; a deflashing step is required; and yield is low.

Furthermore, blends of ethylene-vinyl acetate resin with vinyl chloride resin have been proposed as flexible vinyl chloride materials in which no plasticizers are used, but these have the problems that tackiness is high; they have a strong odor; heat stability is low; and a sufficiently soft product cannot be produced. Blends of urethane resin with vinyl chloride resin have also been proposed, but these have the problems that the cost is high; they have tackiness; and sufficiently soft product can hardly be produced.

Under the circumstances, the inventors have conducted intensive research in order to find a vinyl chloride resin composition free from the above-mentioned defects. As a result, it has been found that a vinyl chloride resin composition which can provide molded products lower in surface tackiness can be obtained by adding a plasticizer and a vinyl chloride resin having a polyvinyl chloride gel portion insoluble in tetrahydrofuran to a reaction product of a polyol-containing vinyl chloride polymer with an isocyanate compound. The present invention is based on this finding.

The present invention is a vinyl chloride resin composition composed mainly of (A) 100 parts by weight of a reaction product of (i) a polyol-containing vinyl chloride polymer with (ii) an isocyanate compound, the urethane content in the reaction product being 30-60% by wt., (B) 10-300 parts by weight of a vinyl chloride resin comprising 8-90% by weight of polyvinyl chloride gel portion insoluble in tetrahydrofuran and the balance of tetrahydrofuran-soluble portion, and (3) 0-200 parts by weight of a plasticizer.

The polyol-containing vinyl chloride polymer obtained by polymerizing vinyl chloride monomer in an aqueous medium in the presence of a polyol soluble in the vinyl chloride monomer and the isocyanate compound which are used in the present invention, are shown below.

Among polyols used in the present invention, short-chain polyols include, for example, aliphatic, alicyclic, aromatic, or heterocyclic dihydroxy, trihydroxy and tetrahydroxy compounds. Typical examples thereof are 1,2-ethanediol, 1,2-propanediol, 1,4-butanediol, butenediol, 1,6-hexanediol, 1,10-decamethylenediol, 2,5-dimethyl-2,5-hexanediol, neopentyl glycol, diethylene glycol, 1,4-cyclohexanedimethanol, bis(β-hydroxyethoxy)benzene, p-xylenediol, dihydroxyethyl tetrahydrophthalate, trimethylolpropane, glycerin, 2-methylpropane-1,2,3-triol, 1,2,4-hexanetriol and pentaerythritol.

As long-chain polyols, there may be used, for example, polyester polyols, polyether polyols, polycarbonate polyols, vinyl polyols, diene polyols, castor oil polyols, silicone polyols, polyolefin polyols and copolymers thereof.

These long-chain polyols have a molecular weight of preferably 300-10,000, more preferably 500-8,000.

Polymerization method employed for preparation of the polyol-containing PVC may be any of suspension polymerization, fine suspension polymerization and emulsion polymerization. Charging proportion of a polyol is 200% by weight or less based on the weight of vinyl chloride monomer (hereinafter referred to as "VCM"). Polymerization is carried out by the conventional method, namely, using an ordinary polymerization autoclave at a temperature of 30-70° C., preferably 40-70° C.

The term "vinyl chloride polymer" used here means vinyl chloride homopolymers or copolymers of vinyl chloride as a main component with a monomer copolymerizable with vinyl chloride. As the monomers copolymerizable with VCM, there may be cited, for example, vinylidene monomers such as vinylidene chloride and vinylidene fluoride; esters of acrylic acid such as methyl acrylate, ethyl acrylate, butyl acrylate, octyl acrylate, and cyanoethyl acrylate; esters of methacrylic acid such as methyl methacrylate, ethyl methacrylate, and butyl methacrylate; styrene and styrene derivatives such as methylstyrene, vinyltoluene, and chlorostyrene; vinyl monomers such as acrylonitrile, ethylvinylbenzene, and vinylnaphthalene, and alkadiene monomers such as butadiene, isoprene and chloroprene.

As the isocyanate compounds used in the present invention, there may be cited, for example, diisocyanates such as 2,4- and 2,6-tolylene diisocyanates, m- and p-phenylene diisocyanates, 1-chlorophenylene-2,4-diisocyanate, 1,5-naphthalene diisocyanate, methylenebisphenylene-4,4-diisocyanate, m-and p-xylene diisocyanates, hexamethylene diisocyanate, lysine diisocyanate, 4,4-methylenebis(cyclohexyl isocyanate), isophorone diisocyanate, and trimethylhexamethylene diisocyanate; triisocyanates such as 1,6,11-undecane triisocyanate, lysine ester isocyanate, and 4-isocyanate methyl-1,8-octamethylene diisocyanate; polyfunctional isocyanates such as polyphenylmethane polyisocyanate; dimers and trimers of these isocyanates; and polyisocyanate compounds having terminal isocyanate groups which ar obtained by reacting active hydrogen compounds such as the above-mentioned short-chain and long-chain polyols, water and amino compounds with the above isocyanate compounds.

The urethane content in the reaction product of the polyol-containing vinyl chloride polymer and the isocyanate compound is 30-60% by weight, desirably 50-60% by weight. If the urethane content is more than 60% by weight, dispersion during polymerization becomes unstable and fine particles can hardly be obtained and in this case, particles of polymer are fused to each other during drying and satisfactory drying cannot be performed.

The expression "urethane content" used herein means the residue obtained by extracting plasticizer with n-hexane from the extraction residue which is obtained by extracting a reaction product of a polyol-containing vinylchloride polymer with an isocyanate compound by use of a Soxhlet's extractor with hot tetrahydrofuran for 20 hours and separating with a 350 mesh filter according to JIS Z8801- 1966.

The feature of the vinyl chloride resin used in the composition of the present invention is that the gel content is 8-90% by weight, preferably 8-80% by weight, which makes it possible to produce molded products of low permanent compression set. If the gel content in the vinyl chloride resin is less than 8% by weight, permanent compression set is not lower than 50%, and when the gel content is more than 90% by weight, permanent compression set is less than 50%, but knitting performance at kneading is inferior so as to cause problems in processing and in practical use such as inferior surface state of molded products. On the other hand, the remainder, tetrahydrofuran soluble portion has no special limitation. However, if average polymerization degree of the soluble portion is too high, there occur problems in processing such as necessity of melting at high temperature and high extrusion power. Furthermore, too low average polymerization degree brings about the state where the gel portion is filled merely as a filler and strength of molded products is reduced. Therefore, average polymerization degree of the soluble portion is generally 400-10000, desirably 700-7000.

These vinyl chloride resins can be produced, for example, by a process which comprises adding to polymerization system of vinyl chloride a polyfunctional compound, for example, diallyl esters of phthalic acid such as diallyl phthalate, diallyl isophthalate and diallyl terephthalate; diallyl esters of ethylenically unsaturated dibasic acids such as diallyl maleate, diallyl fumarate and diallyl itaconate; diallyl esters of saturated dibasic acids such as diallyl adipate, diallyl azelate and diallyl sebacate; diallyl ether, triallyl cyanurate, triallyl isocyanurate, and triallyl trimellitate and a divinyl ether such as ethylene glycol divinyl ether, n-butanediol divinyl ether, decanedivinyl ether or octadecanedivinyl ether; dimethacrylates or diacrylates of polyhydric alcohols such as ethylene glycol dimethacrylate, diethylene glycol dimethacrylate, triethylene glycol dimethacrylate, diethylene glycol diacrylate and triethylene glycol diacrylate; trimethacrylates or triacrylates of polyhydric alcohols such as trimethylolpropane trimethacrylate, trimethylolethane trimethacrylate, trimethylolpropane triacrylate, trimethylolethane triacrylate and tetramethylolmethane triacrylate; and bismethacryloyloxyethylene phthalate and 1,3,5-triacryloylhexahydrotriazine and then carrying out polymerization so that the desired amount of gel portion is produced, or a process which comprises polymerizing vinyl chloride with the above-mentioned polyfunctional compound to produce polyvinyl chloride gel and mixing this gel with a tetrahydrofuran-soluble vinyl chloride resin prepared by the conventional process.

The term "vinyl chloride resin" used here means vinyl chloride homopolymers and copolymers of vinyl chloride as a main component and a monomer copolymerizable therewith. As the monomer copolymerizable with vinyl chloride, there may be cited, for example, fatty acid vinyl esters, vinylidene halides, alkyl acrylates, alkyl methacrylates, acrylonitrile, alkylvinyl ethers, and styrene and derivatives thereof.

The term "tetrahydrofuran-insoluble gel portion" used herein means an extraction residue obtained by subjecting a vinyl chloride resin to extraction treatment with hot tetrahydrofuran for 22 hours using a Soxhlet's extractor and then subjecting the resin to separation by a 350 mesh filter.

If the amount of the vinyl chloride resin is less than 10 parts by weight, fine irregularities on the surface of molded products disappear and the surface lacks matte effect and improvement of tackiness is not obtained. If the amount is more than 300 parts by weight, content of urethane based on the whole composition decreases and hardness is not reduced unless plasticizer is used in a large amount and thus effect to reduce tackiness is lost.

As examples of plasticizers, there may be cited alkyl esters of aromatic polybasic acids such as dibutyl phthalate, dioctyl phthalate and dibutylbenzyl phthalate; alkyl esters of aliphatic polybasic acids such as dioctyl adipate, dioctyl azelate and dioctyl sebacate; aryl esters of phosphoric acid such as tricresyl phosphate and polyesters. Use of more than 200 parts by weight of plasticizer causes increase in tackiness.

The vinyl chloride resin composition of the present invention can be used as it is, but if necessary, it may further contain other thermoplastic resin, rubber, heat stabilizer, filler, pigment, processing aid and the like.

The other thermoplastic resins include, for example, general vinyl chloride resin, ethylene-vinyl acetate copolymer, ethylene-vinyl chloride copolymer, chlorinated polyethylene, ABS resin, polyester resin, AS resin, urethane resin and acrylic resin. The rubbers include, for example, NBR and CR.

The heat stabilizers include, for example, lead heat stabilizers such as tribasic lead sulfate, tin stabilizers such as dibutyltin maleate and metallic soaps such as zinc stearate, calcium stearate and barium stearate. Addition amount of the stabilizer is generally 5 parts by weight or less per 100 parts by weight of urethane vinyl chloride copolymer.

The fillers include, for example, carbon black, calcium carbonate, titanium oxide, talc, mica, asbestos, aluminum hydroxide, and magnesium hydroxide. Addition amount of the filler is usually 100 parts by weight or less per 100 parts by weight of urethane vinyl chloride copolymer.

The pigments include, for example, color carbon black, chrome yellow, titanium oxide and Phthalocyanine Green. Addition amount thereof is generally 5 parts by weight or less per 100 parts by weight of urethane vinyl chloride copolymer.

As the processing aids, there may be used those which are usually employed for vinyl chloride resins such as low molecular weight polyethylene and higher fatty acid esters.

The vinyl chloride resin composition of the present invention can be granulated by the same method as used for the conventional vinyl chloride resin. That is, the present resin composition is mixed with heat stabilizer, filler, pigment, processing aid and others by a mixer such as super mixer or blender and the mixture is kneaded and granulated by Banbury mixer, mixing roll, extruder or the like.

The resulting pellets can be subjected to injection molding, extrusion molding, blow molding, calendering, and compression molding like general flexible vinyl chloride resins, and the resulting molded products have good appearance like the general flexible vinyl chloride resins.

Uses of the vinyl chloride resin composition of the present invention are automobile interior trims such as handle, horn pad, change lever knob, armrest and assist grip, tube, hose covering material, grip, etc.

The composition of the present invention is of very high utility value in that molded products having low surface tackiness nearly the same as that of molded products obtained from urethane resins can be obtained by using the composition and besides that the composition is better in processability than urethane resins, is simple in color matching, can be recycled and is low in cost.

The present invention is explained by the following examples and comparative examples. Amounts of components are shown in part by weight.

EXAMPLES 1-5 AND COMPARATIVE EXAMPLES 1-4

To 100 parts by weight of a reaction product (DOMINUS K550F, K650F, K700F, K800F and K900F) of a polyol-containing vinyl chloride polymer with an isocyanate compound, more particularly a urethane-vinyl chloride graft copolymer which is a thermoplastic elastomer, which has urethane content of 30-60% by weight, were added 50 parts by weight of a vinyl chloride resin of 1000 in average polymerization degree which comprises 45% of tetrahydrofuran-insoluble polyvinyl chloride gel portion and the remainder of tetrahydrofuran-soluble portion, 60 parts by weight of 2-ethylhexyl phthalate plasticizer and 2 parts by weight of a Ba-Zn type heat stabilizer (Rup-14 manufactured by Adeka Argus Co.), and the mixture was kneaded by a roll at a roll temperature of 130° C. to make pellets. A molded product of 2 mm in thickness, 50 mm in width and 70 mm in length was produced from the pellets by an injection molding machine. Tackiness of the surface of this molded product was evaluated by touch with hand and shown according to the following three grades.

◯: Good
Δ: Somewhat Bad
×: Bad

Furthermore, a pressed sheet was made from the above pellets and hardness of this sheet was measured. Moreover, operability in preparing pellets was evaluated by sticking state of the mixture to roll in kneading by the roll. The results are shown in Table 1.

As shown in Table 1, molded products obtained in Examples 1-5 were lower in surface tackiness as compared with that of Comparative Example 1 where 100 parts by weight of a reaction product (DOMINUS K550F) of a polyol-containing vinyl chloride polymer with an isocyanate compound having urethane content of 60% by weight was solely used, that of Comparative Example 2 where 100 parts by weight of a polyvinyl chloride resin having an average polymerization degree of 1000 and comprising 45% by weight of tetrahydrofuran-insoluble polyvinyl chloride gel portion and the remainder of tetrahydrofuran-soluble portion and 110 parts by weight of 2-ethylhexyl phthalate plasticizer were used, and those of Comparative Examples 3-4 where 100 parts by weight of a vinyl chloride resin having an average polymerization degree of 1000 or 1300 and 110 parts by weight of 2-ethylhexyl phthalate were used.

TABLE 1

|  | Example |  |  |  |  | Comparative Example |  |  |  |
|---|---|---|---|---|---|---|---|---|---|
|  | 1 | 2 | 3 | 4 | 5 | 1 | 2 | 3 | 4 |
| Composition |  |  |  |  |  |  |  |  |  |
| K550F *1) | 100 |  |  |  |  | 100 |  |  |  |
| K650F |  | 100 |  |  |  |  |  |  |  |
| K700F |  |  | 100 |  |  |  |  |  |  |
| K800F |  |  |  | 100 |  |  |  |  |  |
| K900F |  |  |  |  | 100 |  |  |  |  |
| PVC (P1000, gel portion 45%) *2) | 50 | 50 | 50 | 50 | 50 |  | 100 |  |  |
| PVC (P1000, gel portion 0%) *3) |  |  |  |  |  |  |  | 100 |  |
| PVC (P1300, gel portion 0%) *4) |  |  |  |  |  |  |  |  | 100 |
| 2-Ethylhexyl phthalate | 60 | 60 | 60 | 60 | 60 | 0 | 110 | 110 | 110 |
| Characteristics |  |  |  |  |  |  |  |  |  |
| Hardness | 45 | 50 | 55 | 60 | 70 | 55 | 50 | 50 | 50 |
| Operability at preparation of pellets | ◦ | ◦ | ◦ | ◦ | ◦ | ◦ | ◦ | ◦ | ◦ |
| Surface tackiness of molded product | ◦ | ◦ | ◦ | ◦ | ◦ | Δ | Δ | × | × |

◦ Good
Δ Somewhat bad
× Bad

*1) K550F: Toso Co., Ltd. DOMINUS K550F: Hardness 55 Urethane content 60 wt. %
K650F: Toso Co., Ltd. DOMINUS K650F: Hardness 65 Urethane content 50 wt. %
K700F: Toso Co., Ltd. DOMINUS K700F: Hardness 70 Urethane content 45 wt. %
K800F: Toso Co., Ltd. DOMINUS K800F: Hardness 80 Urethane content 40 wt. %
K900F: Toso Co., Ltd. DOMINUS K900F: Hardness 90 Urethane content 30 wt. %
*2) PVC (P1000, gel portion 45%) manufactured by Sumitomo Chemical Co., Ltd.
*3) PVC (P1000, gel portion 0%): TH1000 manufactured by Toso Co., Ltd.
*4) PVC (P1300, gel portion 0%): TH1300 manufactured by Toso Co., Ltd.

EXAMPLES 6-9 AND COMPARATIVE EXAMPLES 5-10

As shown in Table 2, to 100 parts by weight of a reaction product (DOMINUS K650F) of a polyol-containing vinyl chloride polymer with an isocyanate compound having urethane content of about 50% by weight were added 50 or 200 parts by weight of a vinyl chloride resin of 1000 or 1800 in average polymerization degree which comprises 45% or 35% of tetrahydrofuran-insoluble polyvinyl chloride gel portion and the remainder of tetrahydrofuran-soluble portion, 60 or 165 parts by weight of a plasticizer and 2 parts by weight of a Ba-Zn type heat stabilizer (Rup-14 manufactured by Adeka Argus Co.), and the mixture was kneaded by roll at a roll temperature of 130° C. to make pellets. Production of samples and evaluation of characteristics of the samples were conducted in the same manner as in Examples 1-5. As shown in Table 2, molded products obtained in Examples 6-9 where the compositions of the present invention were used, were less in surface tackiness as compared with those of Comparative Examples 5-6 where vinyl chloride resin containing gel portion in an amount less than 8-90% by weight specified in the present invention was used, and those of Comparative Examples 7-10 where amount of vinyl chloride resins used was outside the range of 10-300 parts by weight specified in the present invention.

TABLE 2

|  | Example | | | | Comparative Examples | | | | | |
| --- | --- | --- | --- | --- | --- | --- | --- | --- | --- | --- |
|  | 6 | 7 | 8 | 9 | 5 | 6 | 7 | 8 | 9 | 10 |
| Composition |
| K650F | 100 | 100 | 100 | 100 | 100 | 100 | 100 | 100 | 100 | 100 |
| PVC (P1000, gel portion 45%) | 50 | 200 | | | | | 5 | 400 | | |
| PVC (P1800, gel portion 35%) *5) | | | 50 | 200 | | | | | 5 | 400 |
| PVC (P5000, gel portion 5%) *6) | | | | | 50 | 200 | | | | |
| 2-Ethylhexyl phthalate | 60 | 165 | 60 | 165 | 60 | 165 | 15 | 200 | 15 | 200 |
| Characteristics |
| Hardness | 50 | 50 | 50 | 50 | 50 | 50 | 50 | 75 | 50 | 75 |
| Operability at preparation of pellets | o | o | o | o | o | o | o | o | o | o |
| Surface tackiness of molded product | o | o | o | o | Δ | Δ | Δ | Δ | Δ | Δ |

*5) PVC (P1800, gel portion 35%) manufactured by Sumitomo Chemical Co., Ltd.
*6) PVC (P5000, gel portion 5%) manufactured by Sumitomo Chemical Co., Ltd.

EXAMPLES 10-12 AND COMPARATIVE EXAMPLES 11-12

To 100 parts by weight of a reaction product of a polyol-containing vinyl chloride polymer with an isocyanate compound having an urethane content of about 50% by weight were added 50 parts by weight of a vinyl chloride resin of 1000 in average polymerization degree which comprises 45% of tetrahydrofuran-insoluble polyvinyl chloride gel portion and the remainder of tetrahydrofuran-soluble portion, 50, 100 or 200 parts by weight of 2-ethylhexyl phthalate plasticizer and 2 parts by weight of a Ba-Zn type heat stabilizer (Rup-14 manufactured by Adeka Argus Co.), and the mixture was kneaded by roll at a roll temperature of 130° C. to make pellets. Production of samples and evaluation of characteristics of the samples were conducted in the same manner as in Examples 1-5. As shown in Table 3, molded products obtained in Examples 10-12 where the compositions of the present invention were used, were less in surface tackiness as compared with those obtained in Comparative Examples 11-12 where 2-ethylhexyl phthalate plasticizer was added in an amount of 250 or 300 parts by weight.

TABLE 3

|  | Example | | | Comparative Example | |
| --- | --- | --- | --- | --- | --- |
|  | 10 | 11 | 12 | 11 | 12 |
| Composition |
| K650F | 100 | 100 | 100 | 100 | 100 |
| PVC (P1000, gel portion 45%) | 50 | 50 | 50 | 50 | 50 |
| 2-Ethylhexyl phthalate | 50 | 100 | 200 | 250 | 300 |
| Characteristics |
| Hardness | 55 | 35 | 20 | 15 | 10 |
| Operability at preparation of pellets | o | o | o | X | X |
| Surface tackiness of molded product | o | o | o | X | X |

What is claimed is:

1. A vinyl chloride resin composition consisting essentially of:
   A) 100 parts by weight of a reaction product of (i) a polyol-containing vinyl chloride polymer and (ii) an isocyanate compound, wherein urethane content in the reaction product is from 30-60% by weight, and said reaction product is obtained by dissolving a polyol in a vinyl chloride monomer, polymerizing the vinyl chloride monomer, and reacting an isocyanate with said polyol to obtain the reaction product;
   B) 10-300 parts by weight of a vinyl chloride resin comprising 8-90% by weight of a tetrahydrofuran-insoluble polyvinyl chloride gel portion and a remainder of a tetrahydrofuran-soluble portion having an average polymerization degree of 400-10,000; and
   C) 0-200 parts by weight of a plasticizer.

2. A composition according to claim 1, wherein the polyol is a short-chain polyol selected from the group consisting of aliphatic, alicyclic, aromatic, substituted aliphatic and heterocyclic dihydroxy, trihydroxy and tetrahydroxy compounds or a long-chain polyol selected from the group consisting of polyester polyols, polyether polyols, polycarbonate polyols, vinyl polyols, diene polyols, castor oil polyols, silicone polyols, polyolefin polyols and copolymers thereof.

3. A composition according to claim 1, wherein the vinyl chloride polymer is a vinyl chloride homopolymer or a copolymer of vinyl chloride as a main component and a monomer copolymerizable therewith.

4. A composition according to claim 3, wherein the monomer copolymerizable with vinyl chloride is selected from the group consisting of vinylidene compounds, acrylic esters, methacrylic esters, styrene compounds, vinyl compounds other than vinyl chloride and alkadienes.

5. A composition according to claim 1, wherein the isocyanate compound is selected from the group consisting of diisocyanate compounds, triisocyanate compounds, dimers and trimers of these isocyanate compounds and polyisocyanate compounds obtained by reaction of these isocyanate compounds with active hydrogen compounds.

6. A composition according to claim 1, wherein the vinyl chloride resin is a vinyl chloride homopolymer or a copolymer of vinyl chloride as a main component and a monomer copolymerizable therewith.

7. A composition according to claim 6, wherein the monomer copolymerizable with vinyl chloride is selected from the group consisting of fatty acid vinyl esters, vinylidene halides, acrylic acid alkyl esters, methacrylic acid alkyl esters, acrylonitrile, alkylvinyl ethers, styrene and derivatives thereof.

8. A composition according to claim 1, wherein the plasticizer is selected from the group consisting of alkyl esters of aromatic polybasic acids, alkyl esters of aliphatic polybasic acids, aryl esters of phosphoric acid and polyesters.

9. A composition according to claim 1, which additionally contains as a non-essential component an additive selected from the group consisting of other thermoplastic resins, rubbers, heat stabilizer, fillers, pigments and processing aids.

10. A composition according to claim 1, wherein the reaction of said isocyanate is with unreacted polyol.

11. A molded product of the composition of claim 10, having a hardness of less than 80 according to JIS K6301A-type.

12. A vinyl chloride resin composition according to claim 1 wherein said reaction product (A) is a urethane-vinyl chloride graft copolymer.

13. A vinyl chloride resin composition according to claim 12, wherein said urethane-vinyl chloride graft co-polymer is a thermoplastic elastomer.

* * * * *